US012194717B2

(12) United States Patent
Takemura et al.

(10) Patent No.: US 12,194,717 B2
(45) Date of Patent: Jan. 14, 2025

(54) AIR MANAGEMENT SYSTEM MEMBER AND FLUORORUBBER COMPOSITION

(71) Applicant: DAIKIN INDUSTRIES, LTD., Osaka (JP)

(72) Inventors: Kouhei Takemura, Osaka (JP); Yusuke Kamiya, Osaka (JP)

(73) Assignee: DAIKIN INDUSTRIES, LTD., Osaka (JP)

( * ) Notice: Subject to any disclaimer, the term of this patent is extended or adjusted under 35 U.S.C. 154(b) by 127 days.

(21) Appl. No.: 16/764,204

(22) PCT Filed: Nov. 5, 2018

(86) PCT No.: PCT/JP2018/040952
§ 371 (c)(1),
(2) Date: May 14, 2020

(87) PCT Pub. No.: WO2019/098062
PCT Pub. Date: May 23, 2019

(65) Prior Publication Data
US 2020/0392323 A1    Dec. 17, 2020

(30) Foreign Application Priority Data
Nov. 17, 2017  (JP) .................. 2017-222099

(51) Int. Cl.
| B32B 27/30 | (2006.01) |
| B32B 1/08 | (2006.01) |
| B32B 25/20 | (2006.01) |
| B32B 27/18 | (2006.01) |
| C08K 3/26 | (2006.01) |
| C08K 5/00 | (2006.01) |
| C08K 5/14 | (2006.01) |
| C08L 27/14 | (2006.01) |
| C08L 27/18 | (2006.01) |
| C08L 27/20 | (2006.01) |

(52) U.S. Cl.
CPC .............. B32B 27/304 (2013.01); B32B 1/08 (2013.01); B32B 25/20 (2013.01); B32B 27/18 (2013.01); C08K 3/26 (2013.01); C08K 5/0025 (2013.01); C08K 5/14 (2013.01); C08L 27/14 (2013.01); C08L 27/18 (2013.01); C08L 27/20 (2013.01); B32B 2305/72 (2013.01); B32B 2597/00 (2013.01); B32B 2605/08 (2013.01); B32B 2605/12 (2013.01); C08L 2201/08 (2013.01); C08L 2205/02 (2013.01); C08L 2312/00 (2013.01)

(58) Field of Classification Search
CPC .. F16L 11/04; F16L 11/06; C08K 3/26; C08K 5/14; C08K 5/0025; C08K 5/34924; Y10T 428/1386; Y10T 428/39; B32B 2608/08; B32B 25/042; B32B 2597/00; B32B 1/08; C08L 27/12; C08L 27/14; C08L 27/16; C08L 27/18; C08L 27/20

USPC ........................................ 428/36.91
See application file for complete search history.

(56) References Cited

U.S. PATENT DOCUMENTS

| 5,374,484 A * | 12/1994 | Kasahara ................. C08K 5/14 |
| | | 524/529 |
| 6,467,509 B1 * | 10/2002 | Iio ........................... F16L 11/04 |
| | | 138/140 |
| 2003/0049399 A1 * | 3/2003 | Noguchi ............... B32B 25/042 |
| | | 428/36.9 |
| 2004/0142135 A1 * | 7/2004 | Verschuere .............. B32B 1/08 |
| | | 428/36.9 |
| 2008/0276524 A1 * | 11/2008 | Fuller ....................... C08K 3/22 |
| | | 44/308 |
| 2011/0269911 A1 | 11/2011 | Morita et al. |
| 2012/0073696 A1 * | 3/2012 | Terada ..................... C08K 3/04 |
| | | 138/177 |
| 2015/0299356 A1 * | 10/2015 | Fukushi .................. C08K 5/14 |
| | | 525/387 |
| 2016/0289414 A1 * | 10/2016 | Verschuere .............. C08K 5/14 |

FOREIGN PATENT DOCUMENTS

| EP | 1507110 A1 * | 2/2005 | .............. B32B 1/08 |
| EP | 1568484 A1 * | 8/2005 | .............. B32B 1/08 |
| EP | 1 585 786 | 10/2005 | |
| EP | 2 019 127 A1 | 1/2009 | |
| EP | 3135477 A1 * | 3/2017 | .............. B32B 1/08 |
| JP | 2006-299224 A | 11/2006 | |
| JP | 2012-512264 A | 5/2012 | |
| JP | 2013-216915 A | 10/2013 | |
| JP | 2016-131953 A | 7/2016 | |
| JP | 2017-008166 A | 1/2017 | |
| JP | 2017-500397 A | 1/2017 | |
| JP | 2017-095592 A | 6/2017 | |
| WO | 2004/067618 A1 | 8/2004 | |
| WO | 2015/088940 A1 | 6/2015 | |

(Continued)

OTHER PUBLICATIONS

Database WPI, Week 201739, Jun. 1, 2017, Thomson Scientific, London, GB; An 2017-34802S, XP002803169 (2 pages total).
Extended European Search Report dated Jun. 14, 2021 from the European Patent Office in counterpart EP Application No. 18879519.9.
International Search Report for PCT/JP2018/040952, dated Jan. 22, 2019.
International Preliminary Report on Patentability with translation of Written Opinion dated May 19, 2020, in International Application No. PCT/JP2018/040952.

*Primary Examiner* — James C Yager
(74) *Attorney, Agent, or Firm* — Sughrue Mion, PLLC

(57) ABSTRACT

An air management system component containing a crosslinked fluoroelastomer layer obtained by crosslinking a fluoroelastomer composition that contains a peroxide-crosslinkable fluoroelastomer and a hydrotalcite compound. Also disclosed is the fluoroelastomer composition.

4 Claims, No Drawings

(56) References Cited

FOREIGN PATENT DOCUMENTS

| WO | 2017/035207 A1 | 3/2017 |
| WO | 2019/098064 A1 | 5/2019 |

\* cited by examiner

AIR MANAGEMENT SYSTEM MEMBER AND FLUORORUBBER COMPOSITION

CROSS REFERENCE TO RELATED APPLICATIONS

This application is a National Stage of International Application No. PCT/JP2018/040952 filed Nov. 5, 2018, claiming priority based on Japanese Patent Application No. 2017-222099 filed Nov. 17, 2017.

TECHNICAL FIELD

The invention relates to air management system components and fluoroelastomer compositions.

BACKGROUND ART

Air management system components, such as components constituting air filters, turbochargers, intercoolers, intake manifolds, exhaust gas recirculation coolers, and others attached to common engines (e.g., for automobiles, ships, construction equipment) need to have heat resistance in a high-temperature environment. In order to achieve such a required feature, a variety of rubber materials are developed. In terms of the heat resistance, for example, fluoroelastomer, silicone rubber, acrylic rubber, and combination of these are used, and polymer alloys of fluoroelastomer and fluororesin are also known.

Patent Literature 1 discloses an air management system including a molded article that is obtainable by crosslinking a fluoroelastomer composition containing a polyol-crosslinkable fluoroelastomer and a hydrotalcite compound.

CITATION LIST

Patent Literature

Patent Literature 1: JP 2017-95592 A

SUMMARY OF INVENTION

Technical Problem

The invention aims to provide an air management system component that well adheres to silicone rubber while maintaining high acid resistance owing to a peroxide-crosslinkable fluoroelastomer.

Solution to Problem

The inventor examined the acid resistance and the adhesiveness to silicone rubber and found that mixing a hydrotalcite compound into a peroxide-crosslinkable fluoroelastomer composition can lead to good adhesiveness to silicone rubber while maintaining the acid resistance, completing the invention.

In other words, the invention relates to an air management system component including a crosslinked fluoroelastomer layer obtainable by crosslinking a fluoroelastomer composition that contains a peroxide-crosslinkable fluoroelastomer and a hydrotalcite compound.

The air management system component preferably consists of the crosslinked fluoroelastomer layer, and is more preferably a laminate constituted of the crosslinked fluoroelastomer layer and a rubber layer containing silicone rubber.

The hydrotalcite compound contained in the fluoroelastomer composition is preferably a compound represented by the following formula (1):

$$[(M_1^{2+})_{1-x}M^{3+}_x(OH)_2]^{x+}[A^{n-}_{x/n} \cdot mH_2O]^{x-} \quad (1)$$

wherein $M_1^{2+}$ is a divalent metal ion; $M^{3+}$ is a trivalent metal ion; $A^{n-}$ is an n-valent anion; x is a number satisfying $0<x<0.5$; and m is a number satisfying $0 \leq m$.

In the formula (1), preferably, $M_1^{2+}$ is $Mg^{2+}$ and/or $Zn^{2+}$, $M^{3+}$ is $Al^{3+}$, and $A^{n-}$ is $CO_3^{2-}$.

The hydrotalcite compound contained in the fluoroelastomer composition is preferably present in an amount of 0.1 to 30 parts by mass relative to 100 parts by mass of the fluoroelastomer.

The air management system component of the invention is preferably used for a turbocharger hose or an exhaust gas recirculation hose.

The invention also relates to a fluoroelastomer composition that is used for the air management system component and that contains a peroxide-crosslinkable fluoroelastomer and a hydrotalcite compound.

Advantageous Effects of Invention

The air management system component of the invention includes a crosslinked fluoroelastomer layer obtainable by crosslinking a fluoroelastomer composition that contains a peroxide-crosslinkable fluoroelastomer and a hydrotalcite compound, and thus has high adhesiveness to silicone rubber while maintaining high acid resistance.

DESCRIPTION OF EMBODIMENTS

The air management system component of the invention includes a crosslinked fluoroelastomer layer obtainable by crosslinking a fluoroelastomer composition that contains a peroxide-crosslinkable fluoroelastomer and a hydrotalcite compound. The fluoroelastomer composition of the invention contains a peroxide-crosslinkable fluoroelastomer and a hydrotalcite compound and is used for the air management system component. The crosslinked fluoroelastomer layer is preferably a laminate with a rubber layer containing silicone rubber.

The air management system is a system in which a gas circulates. Examples thereof include air filters, turbochargers, intercoolers, intake manifolds, and exhaust gas recirculation coolers attached to common engines (e.g., for automobiles, ships, construction equipment).

The air management system component is a component constituting an air management system, including a component directly connected to the air management system. Examples thereof include air ducts, turbocharger hoses, exhaust gas recirculation (EGR) hoses and seals, hoses and seals for intercoolers, intake manifold seals, hoses and seals for oxygen sensors, and hoses and seals for other sensors. The air management system component may be used at any environmental temperature, preferably 100° C. to 200° C., more preferably 100° C. to 150° C.

The gas circulating in the air management system seems to include at least one selected from the group consisting of $NO_x$, $SO_x$, and an organic acid contained in combustion gas of gasoline, particularly seems to be an organic acid contained in combustion gas of gasoline. Examples of the organic acid contained in combustion gas of gasoline include HCOOH and $CH_3COOH$. In cases where the circulating gas is any of these acids, the acid resistance is improved. The air management system component of the invention is particularly useful. Thus, the air management system component of the invention is more preferably an air management system component in which the above gas circulates, and includes, for example, at least one selected from the group consisting of a turbocharger hose and an EGR hose. In terms of the heat resistance, the air management system component of the invention is particularly useful as an exhaust gas recirculation (EGR) hose or sealant.

The air management system component of the invention is preferably a turbocharger hose. The turbocharger system is a system in which the exhaust gas from an engine is sent to and rotates a turbine so that a compressor coupled with the turbine is driven, thereby increasing the compression ratio of the air fed to the engine and improving the output. Such a turbocharger system utilizing the exhaust gas from an engine and achieving a high output enables downsizing of an engine, low fuel consumption of an automobile, and purification of the exhaust gas. The turbocharger hose is used in a turbocharger system as a hose for sending the compressed air to an engine. In order to effectively use the space of a narrow engine room, a rubber hose having excellent flexibility and pliability is advantageously used. Typically used is a multi-layer hose including an inner layer that is a rubber (especially fluoroelastomer) layer having excellent heat-aging resistance and oil resistance and an outer layer formed from silicone rubber or acrylic rubber. Still, the gas circulating inside a turbocharger system is a condensed acidic gas, and thus the turbocharger hose needs to have excellent acid resistance. The air management system component of the invention has heat-aging resistance and oil resistance owing to the fluoroelastomer, as well as excellent acid resistance, and is therefore particularly useful as a turbocharger hose.

The air management system component of the invention is also preferably an exhaust gas recirculation (EGR) hose or sealant. The exhaust gas recirculation (EGR) hose is used as a hose to be used in an exhaust gas recirculation cooler. The hose used in an exhaust gas recirculation cooler is advantageously a rubber hose having excellent flexibility and pliability, and a fluoroelastomer also having excellent heat-aging resistance is preferred. Still, the gas circulating inside an exhaust gas recirculation cooler is a condensed acidic gas, and thus the EGR hose needs to have excellent acid resistance. The air management system component of the invention has heat-aging resistance owing to the fluoroelastomer, as well as excellent acid resistance, and is therefore particularly useful as an EGR hose.

The air management system component of the invention includes a crosslinked fluoroelastomer layer obtainable by crosslinking a fluoroelastomer composition that contains a peroxide-crosslinkable fluoroelastomer and a hydrotalcite compound. The peroxide-crosslinkable fluoroelastomer is less likely to adhere to another material and is significantly poor in adhesiveness particularly to silicone rubber. Still, use of a fluoroelastomer composition containing a hydrotalcite compound can greatly improve the adhesiveness to silicone rubber while maintaining high acid resistance.

For example, although not related to an air management system component, WO 2003/039858 proposes to improve the adhesiveness of a peroxide-crosslinkable fluoroelastomer by addition of a metal oxide such as magnesium oxide to improve the adhesiveness. Still, this is not specialized in an air management system and the document neither describes nor suggests an issue relating to the acid resistance. Accordingly, mixing of a metal oxide can actually improve the adhesiveness but reduces the acid resistance and fails to satisfy sufficient adhesiveness to silicone rubber. Therefore, this technique cannot be used for an air management system component.

JP 2006-513304 T discloses a fuel management system including a molded article obtainable by crosslinking a fluoroelastomer composition that contains a peroxide-crosslinkable fluoroelastomer and a hydrotalcite compound. Still, this disclosure is specialized in a fuel management system and examines only the swellability of the fluoroelastomer in bio diesel fuel. The disclosure fails to examine the adhesiveness to silicone rubber.

The air management system component of the invention may consist of the crosslinked fluoroelastomer layer, may be a laminate of the crosslinked fluoroelastomer layer and a rubber layer containing silicone rubber, or may be a laminate of the crosslinked fluoroelastomer layer, a rubber layer containing silicone rubber, and a layer containing a different material. The air management system component of the invention preferably includes at least a laminate of a crosslinked fluoroelastomer layer and a rubber layer containing silicone rubber. Examples of the layer containing a different material include a variety of rubber layers, as well as layers containing thermoplastic resin, a variety of fiber-reinforced layers, and metal foil layers.

The thermoplastic resin preferably includes at least one thermoplastic resin selected from the group consisting of fluororesin, polyamide-based resin, polyolefin-based resin, polyester-based resin, polyvinyl alcohol-based resin, polyvinyl chloride-based resin, and polyphenylene sulfide-based resin, more preferably at least one thermoplastic resin selected from the group consisting of fluororesin, polyamide-based resin, polyvinyl alcohol-based resin, and polyphenylene sulfide-based resin.

Examples of commercially available products (trade name) of polyorganosiloxane and commercially available products (trade name) containing polyorganosiloxane as the silicone rubber include the following.

Products of Wacker Asahikasei Silicone Co., Ltd.
 ELASTOSIL EL 1000 series, ELASTOSIL EL 4000 series, ELASTOSIL EL 3000 series, ELASTOSIL EL 7000 series, and ELASTOSIL R401 series Products of Dow Corning Toray Co., Ltd.
 SH800 series, SH50 series, SH70 series, SH700 series, SE4000 series, SE1000 series, SH500 series, SE6000 series, SH80 series, SRX400 series, DY32-400 series, DY32-500 series, DY32-1000 series, DY32-7000 series, and DY32-4000 series Shin-Etsu Silicone Rubber Compounds of Shin-Etsu Chemical Co., Ltd.
 KE-600 series, KE-900 series, KE-9000 series, KE-700 series, KE-800 series, KE-5590-U, and KE-500 series
 KE-655-U, KE-675-U, KE-931-U, KE-941-U, KE-951-U, KE-961-U, KE-971-U, KE-981-U, KE-961T-U, KE-971T-U, KE-871C-U, KE-9410-U, KE-9510-U, KE-9610-U, KE-9710-U, KE-742-U, KE-752-U, KE-762-U, KE-772-U, KE-782-U, KE-850-U, KE-870-U, KE-880-U, KE-890-U, KE-9590-U, KE-5590-U, KE-552-U, KE-552DU, KE-582-U, KE-552B-U, KE-555-U, KE-575-U, KE-541-U, KE-551-U, KE-561-U, KE-571-U, KE-581-U, KE-520-U, KE-530B-2-U, KE-540B-2-U, KE-1551-U, KE-1571-U, KE-153-U, KE-174-U, KE-3601SB-U, KE-3711-U, KE-3801M-U, KE-5612G-U, KE-5620BLU, KE-5620W-U, KE-5634-U, KE-7511-U, KE-7611-U, KE-7711-U, KE-765-U, KE-785-U, KE-7008-U, KE-7005-U, KE-503-U, KE-5042-U, KE-505-U, KE-6801-U, KE-136Y-U, X-30-4084-U, X-30-3888-U, and X-30-4079-U Examples of the silicone rubber include a peroxide-crosslinkable polyorganosiloxane and a polyorganosiloxane cured by an addition reaction using a platinum compound used as a catalyst. Preferred is a peroxide-crosslinkable polyorganosiloxane because the same crosslinking system as for the fluoroelastomer can be used.

In the case of producing a multi-layer hose, a surface treatment may be performed as appropriate on the crosslinked fluoroelastomer layer obtained by crosslinking the peroxide-crosslinkable fluoroelastomer composition or a laminate of the crosslinked fluoroelastomer layer and a rubber layer containing silicone rubber. This surface treatment may be of any type as long as the treatment enables adhesion. Examples thereof include discharge treatments such as a plasma discharge treatment and a corona discharge treatment and wet processes such as a metal sodium/naphthalene liquid treatment. A primer treatment is also preferred as a surface treatment. The primer treatment can be performed in accordance with the usual method. The primer treatment may be performed on a surface of a fluoroelastomer with no surface treatment performed thereon. Still, the primer treatment is more effective when performed after a plasma discharge treatment, a corona discharge treatment, a metal sodium/naphthalene liquid treatment, or the like.

In terms of easy availability, the hydrotalcite compound used in the invention is more preferably, but is not limited to, a compound represented by the following formula (1):

$$[(M_1^{2+})_{1-x}M^{3+}_x(OH)_2]^{x+}[A^{n-}_{x/n} \cdot mH_2O]^{x-} \quad (1)$$

(wherein $M_1^{2+}$ is a divalent metal ion; $M^{3+}$ is a trivalent metal ion; $A^{n-}$ is an n-valent anion; x is a number satisfying $0<x<0.5$; and m is a number satisfying $0 \leq m$). The hydrotalcite compound may be either a natural product or a synthetic product.

$M_1^{2+}$ is a divalent metal ion. Examples thereof include $Mg^{2+}$, $Mn^{2+}$, $Fe^{2+}$, $Co^{2+}$, $Ni^{2+}$, $Cu^{2+}$, and $Zn^{2+}$. In terms of easy availability, preferred among these are/is $Mg^{2+}$ and/or $Zn^{2+}$.

$M^{3+}$ is a trivalent metal ion. Examples thereof include $Al^{3+}$, $Fe^{3+}$, $Cr^{3+}$, $Co^{3+}$, and $In^{3+}$. In terms of easy availability, preferred among these is $Al^{3+}$.

$A^{n-}$ is an n-valent anion. Examples thereof include $OH^-$, $F^-$, $Cl^-$, $Br^-$, $NO_3^-$, $CO_3^{2-}$, $SO_4^{2-}$, $Fe(CN)_6^{3-}$, $CH_3COO^-$, an oxalic acid ion, and a salicylic acid ion. In terms of easy availability, preferred among these is $CO_3{2-}$.

In the formula (1), particularly preferably, $M_1^{2+}$ includes $Mg^{2+}$ and/or $Zn^{2+}$, $M^{3+}$ is $Al^{3+}$, and $A^{n-}$ is $CO_3^{2-}$.

In the formula (1), x is a number satisfying $0<x<0.5$, preferably a number satisfying $0.2 \leq x \leq 0.4$, more preferably a number satisfying $0.2 \leq x \leq 0.33$. A hydrotalcite having x within this range can be produced stably.

In the formula (1), m is a number satisfying $0 \leq m$, preferably a number satisfying $0 \leq m \leq 1$.

The hydrotalcite compound is a non-stoichiometric compound represented by the formula (1). In terms of easy availability, preferred among these are one or more compounds selected from the group consisting of $Mg_6Al_2(OH)_{16}CO_3 \cdot 4H_2O$, $Mg_{4.5}Al_2(OH)_{13}CO_3 \cdot mH_2O$ ($0 \leq m$), $Mg_4Al_2(OH)_{12}CO_3 \cdot 3.5H_2O$, $Mg_5Al_2(OH)_{14}CO_3 \cdot 4H_2O$, $Mg_3Al_2(OH)_{10}CO_3 \cdot 1.7H_2O$, and $Mg_3ZnAl_2(OH)_{12}CO_3 \cdot mH_2O$ ($0<m$), more preferred are $Mg_6Al_2(OH)_{16}CO_3 \cdot 4H_2O$, $Mg_{4.5}Al_2(OH)_{13}CO_3 \cdot 3.5H_2O$, and $Mg_3ZnAl_2(OH)_{12}CO_3 \cdot mH_2O$ ($0<m$).

In the fluoroelastomer composition, the hydrotalcite compound is preferably present in an amount of 0.1 to 30 parts by mass, more preferably 0.5 to 10 parts by mass, still more preferably 1 to 6 parts by mass, particularly preferably 2 to 4 parts by mass, relative to 100 parts by mass of the peroxide-crosslinkable fluoroelastomer. Less than 0.1 parts by mass of the hydrotalcite tends to cause reduced adhesive performance to silicone rubber. More than 30 parts by mass thereof tends to cause difficulty in kneading with rubber, an increased hardness of a molded article, and an increased Mooney viscosity of the fluoroelastomer composition, causing difficulty in molding.

The peroxide-crosslinkable fluoroelastomer used in the invention is any fluoroelastomer having a peroxide-crosslinkable cite, and may be a non-perfluoro fluoroelastomer.

Examples of the non-perfluoro fluoroelastomer include a vinylidene fluoride (hereinafter, referred to as VdF) fluoroelastomer, a tetrafluoroethylene (hereinafter, referred to as TFE)/propylene fluoroelastomer, a TFE/propylene/VdF fluoroelastomer, an ethylene/hexafluoropropylene (hereinafter, referred to as HFP) fluoroelastomer, an ethylene/HFP/VdF fluoroelastomer, an ethylene/HFP/TFE fluoroelastomer, a fluorosilicone fluoroelastomer, and a fluorophosphazene fluoroelastomer. These may be used alone or in any combination that does not impair the effects of the invention.

The VdF fluoroelastomer is preferably one represented by the following formula (2):

$$-(M^1)-(M^2)-(N^1)- \quad (2)$$

wherein the structural unit $M^1$ is a structural unit derived from VdF ($m^1$), the structural unit $M^2$ is a structural unit derived from a fluorine-containing ethylenic monomer ($m^2$), and the structural unit $N^1$ is a repeating unit derived from a monomer ($n^1$) copolymerizable with the monomer ($m^1$) and the monomer ($m^2$).

Preferred among the VdF fluoroelastomers represented by the formula (2) are those containing 30 to 85 mol % of the structural unit $M^1$ and 50 to 20 mol % of the structural unit $M^2$, more preferred are those containing 50 to 80 mol % of the structural unit $M^1$ and 55 to 15 mol % of the structural unit $M^2$. The structural unit $N^1$ is preferably present in an amount of 0 to 20 mol % relative to the sum of the amounts of the structural unit $M^1$ and the structural unit $M^2$.

The fluorine-containing ethylenic monomer ($m^2$) used may include one or two or more types of monomers. Examples thereof include fluorine-containing monomers such as TFE, chlorotrifluoroethylene (hereinafter, referred to as CTFE), trifluoroethylene, HFP, trifluoropropylene, tetrafluoropropylene, pentafluoropropylene, trifluorobutene, tetrafluoroisobutene, perfluoro(alkyl vinyl ether) (hereinafter, also referred to as PAVE), vinyl fluoride, and 2,3,3,3-tetrafluoropropylene. Preferred among these are TFE and HFP.

The monomer ($n^1$) may be any monomer copolymerizable with the monomer ($m^1$) and the monomer ($m^2$). Examples thereof include ethylene, propylene, and alkyl vinyl ether. The monomer ($n^1$) is preferably a monomer that gives a crosslinking site. Examples of such a monomer that gives a crosslinking site include an iodine- or bromine-containing monomer represented by the following formula (3):

$$CY^1_2=CY^1-R_f^1CHR^1X^1 \quad (3)$$

(wherein $Y^1$ is a hydrogen atom, a fluorine atom, or $-CH_3$; $R_f^1$ is a fluoroalkylene group, a perfluoroalkylene group, a fluoropolyoxyalkylene group, or a perfluoropolyoxyalkylene group, with the fluoroalkylene group and the perfluoroalkylene group optionally containing an oxygen atom serving as ether bond; $R^1$ is a hydrogen atom or —$CH_3$; and $X^1$ is an iodine atom or a bromine atom), a monomer represented by the following formula (4):

$$CF_2=CFO(CF_2CF(CF_3)O)_m(CF_2)_n-X^2 \tag{4}$$

(wherein m is an integer of 0 to 5; n is an integer of 1 to 3; $X^2$ is a cyano group, a carboxyl group, an alkoxycarbonyl group, or a bromine atom or an iodine atom), and a monomer represented by the following formula (5):

$$CH_2=CH(CF_2)_pI \tag{5}$$

(wherein p is an integer of 1 to 10).

Examples also include iodine-containing monomers, such as perfluoro(6,6-dihydro-6-iodo-3-oxa-1-hexene) and perfluoro(5-iodo-3-oxa-1-pentene), as disclosed in JP H05-63482 B and JP H07-316234 A; iodine-containing monomers, such as $CF_2=CFOCF_2CF_2CH_2I$, as disclosed in JP H04-217936 A; iodine-containing monomers, such as 4-iodo-3,3,4,4-tetrafluoro-1-butene, as disclosed in JP S61-55138 A; bromine-containing monomers as disclosed in JP H04-505341 T; cyano group-containing monomers, carboxyl group-containing monomers, and alkoxycarbonyl group-containing monomers as disclosed in JP H04-505345 T and JP H05-500070 T. These may be used alone or in any combination.

The iodine atom, bromine atom, cyano group, carboxyl group, and alkoxycarbonyl group each can serve as a crosslinking site.

Preferred specific examples of the VdF fluoroelastomer include a VdF/HFP elastomer, a VdF/HFP/TFE elastomer, a VdF/PAVE elastomer, a VdF/TFE/PAVE elastomer, a VdF/HFP/PAVE elastomer, a VdF/HFP/TFE/PAVE elastomer, a VdF/CTFE elastomer, and a VdF/CTFE/TFE elastomer, and include a VdF/HFP elastomer, a VdF/HFP/TFE elastomer, a VdF/PAVE elastomer, a VdF/TFE/PAVE elastomer, a VdF/HFP/PAVE elastomer, a VdF/HFP/TFE/PAVE elastomer, a VdF/2,3,3,3-tetrafluoropropylene elastomer, a VdF/2,3,3,3-tetrafluoropropylene/TFE elastomer, and a VdF/2,3,3,3-tetrafluoropropylene/PAVE elastomer. More preferred are a VdF/HFP elastomer and a VdF/HFP/TFE elastomer.

The VdF/HFP elastomer preferably has a VdF/HFP ratio of (45 to 85)/(55 to 15) mol %, more preferably (50 to 80)/(50 to 20) mol %, still more preferably (60 to 80)/(40 to 20) mol %.

The VdF/HFP/TFE elastomer preferably has a VdF/HFP/TFE ratio of (40 to 80)/(10 to 35)/(10 to 35) mol %.

The TFE/propylene fluoroelastomer is preferably one represented by the following formula (6):

$$-(M^3)-(M^4)-(N^2)- \tag{6}$$

wherein the structural unit $M^3$ is a structural unit derived from TFE ($m^3$), the structural unit $M^4$ is a structural unit derived from propylene ($m^4$), and the structural unit $N^2$ is a repeating unit derived from a monomer ($n^2$) copolymerizable with the monomer ($m^3$) and the monomer ($m^4$)

Preferred among the TFE/propylene fluoroelastomers represented by the formula (6) are those containing 40 to 70 mol % of the structural unit $M^3$ and 60 to 30 mol % of the structural unit $M^4$, more preferred are those containing 50 to 60 mol % of the structural unit $M^3$ and 50 to 40 mol % of the structural unit $M^4$. The structural unit $N^2$ is preferably present in an amount of 0 to 40 mol % relative to the sum of the amounts of the structural unit $M^3$ and the structural unit $M^4$.

The monomer ($n^2$) may be any monomer copolymerizable with the monomer ($m^3$) and the monomer ($m^4$), and is preferably a monomer that gives a crosslinking site. Examples thereof include VdF and ethylene.

The fluoroelastomer may be obtained with the use of a chain transfer agent in polymerization. The chain-transfer agent used may be a bromine compound or an iodine compound.

An exemplary polymerization method with the use of a bromine compound or an iodine compound is emulsion polymerization in an aqueous medium under pressure in the presence of a bromine compound or an iodine compound substantially in the absence of oxygen (iodine transfer polymerization). Representative examples of the bromine compound or the iodine compound to be used include compounds represented by the following formula:

$$R^2I_xBr_y$$

(wherein x and y are each an integer of 0 to 2 and satisfy $1 \le x+y \le 2$; and $R^2$ is a C1-C16 saturated or unsaturated fluorohydrocarbon or chlorofluorohydrocarbon group, or a C1-C3 hydrocarbon group, each of which optionally contains an oxygen atom). The presence of a bromine compound or an iodine compound enables introduction of iodine or bromine into the polymer, and such iodine or bromine introduced can serve as a crosslinking point.

Examples of the iodine compound include 1,3-diiodoperfluoropropane, 2-iodoperfluoropropane, 1,3-diiodo-2-chloroperfluoropropane, 1,4-diiodoperfluorobutane, 1,5-diiodo-2,4-dichloroperfluoropentane, 1,6-diiodoperfluorohexane, 1,8-diiodoperfluorooctane, 1,12-diiodoperfluorododecane, 1,16-diiodoperfluorohexadecane, diiodomethane, 1,2-diiodoethane, 1,3-diiodo-n-propane, $CF_2Br_2$, $BrCF_2CF_2Br$, $CF_3CFBrCF_2Br$, $CFClBr_2$, $BrCF_2CFClBr$, $CFBrClCFClBr$, $BrCF_2CF_2CF_2Br$, $BrCF_2CFBrOCF_3$, 1-bromo-2-iodoperfluoroethane, 1-bromo-3-iodoperfluoropropane, 1-bromo-4-iodoperfluorobutane, 2-bromo-3-iodoperfluorobutane, 3-bromo-4-iodoperfluorobutene-1, 2-bromo-4-iodoperfluorobutene-1, and a monoiodo- and monobromo-substitution product, a diiodo- and monobromo-substitution product, and (2-iodoethyl)- and (2-bromoethyl)-substitution product of benzene. These compounds may be used alone or in any combination. In terms of properties such as polymerization reactivity, crosslinking reactivity, and easy availability, preferably used among these are 1,4-diiodoperfluorobutane, 1,6-diiodoperfluorohexane, and 2-iodoperfluoropropane.

The fluoroelastomer preferably has a fluorine content of 64% by mass or more. The upper limit thereof may be 85% by mass. The fluoroelastomer preferably has an iodine content of 0.001 to 10% by mass, more preferably 0.01% by mass or more, still more preferably 0.1% by mass or more, while more preferably 5% by mass or less.

In the fluoroelastomer composition used in the invention, the peroxide-crosslinkable fluoroelastomer is preferably mixed with a cross-linking agent and a co-cross-linking agent.

The cross-linking agent may be any cross-linking agent commonly used for peroxide crosslinking, and is usually one easily generating a peroxy radical in the presence of heat or a redox system. Specific examples thereof include 1,1-bis(t-butylperoxy)-3,5,5-trimethylcyclohexane, 2,5-dimethylhexane-2,5-dihydroperoxide, di-t-butyl peroxide, t-butylcumyl peroxide, dicumyl peroxide, α,α'-bis(t-butylperoxy)-p-diisopropylbenzene, 2,5-dimethyl-2,5-bis(t-butylperoxy)hexane, 2,5-dimethyl-2,5-bis(t-butylperoxy)hexyne-3, benzoyl peroxide, t-butyl peroxybenzene, 2,5-dimethyl-2,5-di(benzoylperoxy)hexane, t-butyl peroxymaleic acid, and t-butyl peroxyisopropyl carbonate. Preferred among these are those of dialkyl type. The type and amount of the peroxide are selected usually in consideration of factors such as the amount of active —O—O— and the decomposition temperature.

Examples of the co-cross-linking agent include triallyl cyanurate, triallyl isocyanurate (TAIC), triacrylformal, triallyl trimellitate, N,N'-m-phenylene bismaleimide, dipropargyl terephthalate, diallyl phthalate, tetraallyl terephthalamide, and triallyl phosphate. In terms of crosslinkability and physical properties of the crosslinked product, preferred among these is triallyl isocyanurate (TAIC).

The cross-linking agent is preferably contained in an amount of 0.05 to 10 parts by mass, more preferably 1.0 to 5 parts by mass, relative to 100 parts by mass of the fluoroelastomer. Less than 0.05 parts by mass of the cross-linking agent tends to cause insufficient crosslinking of the fluoroelastomer, causing difficulty in providing a molded article. More than 10 parts by mass thereof tends to cause too high a hardness of the resulting composition for crosslinking.

The co-cross-linking agent is preferably contained in an amount of 0.1 to 10 parts by mass, more preferably 0.5 to 5 parts by mass, relative to 100 parts by mass of the fluoroelastomer. Less than 0.1 parts by mass of the co-cross-linking agent tends to cause insufficient crosslinking of the fluoroelastomer, causing difficulty in providing a molded article. More than 10 parts by mass thereof tends to cause reduced molding processability of the resulting composition for crosslinking.

The fluoroelastomer composition used in the invention may contain any of common additives to be contained in a fluoroelastomer composition as appropriate, such as a variety of additives, including a filler (e.g., carbon black, barium sulfate), a processing aid (e.g., wax), a plasticizer, a colorant, a stabilizer, an adhesive aid, a release agent, a conductivity-imparting agent, a thermal-conductivity-imparting agent, a tackifier, a surface non-adhesive agent, a flexibility-imparting agent, a heat resistance improver, and a flame retarder. One or more common cross-linking agents and crosslinking accelerators other than those mentioned above may also be contained.

For example, carbon black preferably has an average particle size of 100 nm or greater, more preferably 150 nm or greater. A filler such as carbon black may be contained in any amount, such as preferably 0 to 150 parts by mass, more preferably 1 to 100 parts by mass, still more preferably 2 to 50 parts by mass, relative to 100 parts by mass of the peroxide-crosslinkable fluoroelastomer.

The fluoroelastomer composition used in the invention can be obtained by kneading a fluoroelastomer, a hydrotalcite compound, a peroxide-cross-linking agent, a co-cross-linking agent, and optionally other compounding agents, such as filler, with a commonly used rubber kneading device. Examples of the rubber kneading device used include a roll, a kneader, a Banbury mixer, an internal mixer, and a twin-screw extruder.

The fluoroelastomer composition may be crosslinked by a commonly used method such as press crosslinking, steam crosslinking, or oven crosslinking, of course. The crosslinking reaction can be performed under any conditions, i.e., under normal pressure, increased pressure, or reduced pressure, or in the air. The crosslinking conditions may be determined as appropriate in accordance with factors such as the type of a cross-linking agent used. The crosslinking is usually performed by heating at a temperature of 150° C. to 300° C. for 1 minute to 24 hours. In the case of press crosslinking or steam crosslinking, the crosslinking is preferably performed at a temperature of 150° C. to 180° C., with the crosslinking duration being at least until the crosslinking time T90, for example, for 1 minute to 2 hours. In the case of oven crosslinking thereafter (i.e., after press crosslinking or steam crosslinking), the crosslinking is preferably performed at a temperature of 170° C. to 250° C., but is not necessarily performed. The crosslinking duration of the oven crosslinking may preferably be 0 to 48 hours, for example. The hose may be a monolayer hose consisting of a fluoroelastomer crosslinked product obtained by crosslinking the fluoroelastomer composition of the invention, or may be a multilayer hose having a layered structure with a different layer.

EXAMPLES

The invention is described hereinbelow with reference to examples. Still, the invention is not intended to be limited by these examples.

<Fluorine Content>

The fluorine content was determined by calculation based on the fluoroelastomer composition determined by $^{19}$F-NMR.

<Iodine Amount>

A 12-mg portion of the fluoroelastomer was mixed with 5 mg of $Na_2SO_3$, and the mixture was combusted in oxygen in a quartz flask with an absorption liquid containing 30 mg of a 1:1 (mass ratio) mixture of $Na_2CO_3$ and $K_2CO_3$ dissolved in 20 mL of pure water. The system was left to stand for 30 minutes, and then the product was analyzed using 20A ion chromatograph available from Shimadzu Corp. The calibration curves used were those of KI standard solutions containing 0.5 ppm or 1.0 ppm of iodine ions.

The materials used in the examples and the comparative examples are listed below.

Fluoroelastomer (1): tertiary fluoroelastomer (VDF/HFP/TFE copolymer, fluorine content: 70.5% by mass, iodine content: 0.23% by mass)
Fluoroelastomer (2): binary fluoroelastomer (VDF/HFP copolymer, fluorine content: 66% by mass, iodine content: 0.18% by mass)
Carbon black: N990
TAIC: triallyl isocyanurate
Cross-linking agent: 2,5-dimethyl-2,5-di(t-butylperoxy) hexane
Hydrotalcite (1): $Mg_{4.5}Al_2(OH)_{13}CO_3 \cdot AH_2O$
Hydrotalcite (2): $Mg_{3.5}Zn_{0.5}Al_2(OH)_{12}CO_3 \cdot BH_2O$
Magnesium oxide: special grade reagent Production Example 1

First, 10 parts by mass of N990 carbon black and 1 part by mass of a vulcanizing agent (trade name: C-23N, available from Shin-Etsu Chemical Co., Ltd., diluted peroxide) were added to 100 parts by mass of silicone rubber (trade name: KE-551u, available from Shin-Etsu Chemical Co., Ltd.). The components were mixed using an open roll at 20° C. for 10 minutes, whereby a silicone rubber composition was obtained. The resulting silicone rubber composition was sheeted using an open roll, whereby a non-crosslinked silicone rubber sheet having a thickness of about 2.5 mm was obtained.

Examples 1 to 5 and Comparative Examples 1 to 4

The components shown in Table 1 were mixed in amounts shown in Table 1 and were kneaded at 30° C. to 50° C. by a common method using a roll, whereby a fluoroelastomer composition was prepared. The resulting fluoroelastomer composition was molded using an open roll, whereby a non-crosslinked fluoroelastomer sheet having a thickness of about 2.5 mm was obtained.

The non-crosslinked fluoroelastomer sheet and the non-crosslinked silicone rubber sheet were stacked and subjected to primary crosslinking by press-crosslinking and molding, and then subjected to secondary crosslinking using a heat oven. Thereby, a laminate was produced in which the fluoroelastomer layer and the silicone rubber layer were crosslink-bonded to each other. The conditions for the primary crosslinking were 160° C. and 10 minutes. The conditions for the secondary crosslinking were 180° C. and four hours.

For the resulting fluoroelastomer composition, the crosslinking characteristics and the normal physical properties were determined and an acid resistance test was performed by the following methods. Using the resulting laminate, a peeling test was performed by the following method. The results are shown in Table 1.

<Vulcanization Characteristics>

For each of the fluoroelastomer compositions produced in the examples and the comparative examples, the degree of crosslinking at 160° C. was determined and the minimum torque (minS'), the maximum torque (maxS'), T10 (time at which the degree of crosslinking reached 10%), T50 (time at which the degree of crosslinking reached 50%), and T90 (time at which the degree of crosslinking reached 90%) were determined with RPA.

<Normal Physical Properties>

Each of the fluoroelastomer compositions produced in the examples and the comparative examples was press crosslinked (primary crosslinking conditions: 160° C. and 10 minutes, secondary crosslinking conditions: 180° C. and four hours) so that a sheet having a thickness of 2 mm was produced. Using TENSILON RTG-1310 available from A&D Co., Ltd. and in conformity with JIS K 6251, the 100% modulus (M100), the breaking strength (Tb), and the elongation at break (Eb) of the sheet were determined. The test speed was set to 500 mm/min.

<Hardness>

Each of the fluoroelastomer compositions produced in the examples and the comparative examples was press crosslinked (primary crosslinking conditions: 160° C. and 10 minutes, secondary crosslinking conditions: 180° C. and four hours) so that a sheet having a thickness of 2 mm was produced. The hardness of the resulting sheet was measured in conformity with JIS K 6253 using a type-A durometer. The measured value corresponds to the peak value.

<Acid Resistance Test>

Each of the fluoroelastomer compositions produced in the examples and the comparative examples was press crosslinked (primary crosslinking conditions: 160° C. and 10 minutes, secondary crosslinking conditions: 180° C. and four hours) so that a sheet having a thickness of 2 mm was produced. The sheet was immersed in a test liquid mixture of an organic acid and an inorganic acid at 90° C. for 168 hours, and then the volume swell (rate of change) was determined. The volume swell was determined from the specific gravities and the weights before and after immersion.

The test liquid mixture used in the acid resistance test had a pH of 1.7 or 3.0 and the concentrations of the components were as follows.

(pH=1.7)
$HNO_3$: 50 ppm
$H_2SO_4$: 1500 ppm
HCOOH: 5000 ppm
$CH_3COOH$: 1500 ppm
HCl: 10 ppm (pH=3.0)
$HNO_3$: 200 ppm
$H_2SO_4$: 25 ppm
HCOOH: 200 ppm
$CH_3COOH$: 200 ppm
HCl: 15 ppm <Peeling Test>

A specimen was cut out of each of the laminates produced in the examples and the comparative examples. The specimen was subjected to a peeling test at a peeling rate of 50 mm/min using TENSILON RTG-1310 available from A&D Co., Ltd. The test temperatures were 23° C., 100° C., and 150° C. The specimen had a width of 25 mm. The peel strength was expressed by N/cm. The cases where either elastomer was broken were evaluated as material failure. The cases where the material failure did not occur, i.e., both elastomers were not broken but separated, were evaluated as interfacial peeling.

TABLE 1

| Example No. | | | Comparative Example 1 | Example 1 | Example 2 | Example 3 | Example 4 | Comparative Example 2 | Comparative Example 3 | Example 5 | Comparative Example 4 |
|---|---|---|---|---|---|---|---|---|---|---|---|
| Composition (parts by mass) | Fluoroelastomer | (1) | 100 | 100 | 100 | 100 | 100 | 100 | | | |
| | Fluoroelastomer | (2) | | | | | | | 100 | 100 | 100 |
| | Carbon black | | 20 | 20 | 20 | 20 | 20 | 20 | 20 | 20 | 20 |
| | TALC | | 4 | 4 | 4 | 4 | 4 | 4 | 4 | 4 | 4 |
| | PERHEXA 258 | | 1.5 | 1.5 | 1.5 | 1.5 | 1.5 | 1.5 | 1.5 | 1.5 | 1.5 |
| | Hydrotalcite (1) | | | 3 | 2 | 10 | | | | | |
| | Hydrotalcite (2) | | | | | | 3 | | | | |
| | Magnesium oxide | | | | | | | | 3 | | 3 |
| Vulcanization characteristics | MinS* (minimum torque) | dNm | 0.2 | 0.2 | 0.1 | 0.3 | 0.2 | 0.3 | 0.2 | 0.2 | 0.3 |
| | MaxS* (maximum torque) | dNm | 23.7 | 24.8 | 24.3 | 25.1 | 23.1 | 29.3 | 16.3 | 17.2 | 18.5 |
| | T10 (time at which crosslinking degree reached 10%) | min | 1.1 | 1.1 | 1.1 | 1.3 | 1.2 | 0.5 | 1.0 | 1.0 | 0.0 |
| | T50 (time at which crosslinking degree reached 50%) | min | 1.8 | 1.8 | 1.4 | 2.1 | 1.9 | 1.6 | 1.7 | 1.5 | 1.3 |

TABLE 1-continued

| | Example No. | | Comparative Example 1 | Example 1 | Example 2 | Example 3 | Example 4 | Comparative Example 2 | Comparative Example 3 | Example 5 | Comparative Example 4 |
|---|---|---|---|---|---|---|---|---|---|---|---|
| | T90 (time at which crosslinking degree reached 90%) | min | 3.2 | 3.0 | 3.1 | 3.3 | 3.5 | 2.7 | 3.5 | 3.2 | 2.5 |
| Normal physical properties | M100 (100% modules) | MPa | 3.1 | 3.7 | 3.5 | 3.9 | 2.9 | 4.5 | 2.1 | 2.3 | 3.4 |
| | Tb (breaking strength) | MPa | 20.5 | 22.0 | 22.1 | 21.5 | 20.1 | 24.7 | 24.3 | 23.4 | 25.0 |
| | Eb (Elongation at break) | % | 310 | 320 | 320 | 300 | 300 | 300 | 400 | 410 | 380 |
| | Hardness | | 67 | 71 | 70 | 72 | 64 | 76 | 65 | 66 | 70 |
| Peeling characteristics | Peeling strength (23° C.) | N/cm | 24 Si side Material failure | 30 Si side Material failure | 26 Si side Material failure | 32 Si side Material failure | 26 Si side Material failure | 27 Si side Material failure | 24 Si side Material failure | 27 Si side Material failure | 26 Si side Material failure |
| | Peeling strength (100° C.) | N/cm | 3.4 Interfacial peeling | 5.1 Interfacial peeling | 4.9 Interfacial peeling | 5.5 Interfacial peeling | 4.9 Interfacial peeling | 4.5 Interfacial peeling | 3.3 Interfacial peeling | 5.5 Interfacial peeling | 3.8 Interfacial peeling |
| | Peeling strength (150° C.) | N/cm | 2.4 Interfacial peeling | 2.8 Interfacial peeling | 2.7 Interfacial peeling | 3.2 Interfacial peeling | 2.7 Interfacial peeling | 2.6 Interfacial peeling | 3.1 Interfacial peeling | 3.3 Interfacial peeling | 3.2 Interfacial peeling |
| Acid Solution immersion test | Swell (pH = 1.7) | % | 1 | 16 | 11 | 19 | 19 | 97 | 1 | 24 | 115 |
| | Swell (pH = 3.0) | % | 1 | 6 | 4 | 8 | 8 | 62 | 1 | 0 | 84 |

Comparative Examples 2 and 4 demonstrate that the presence of magnesium oxide improved the adhesiveness to silicone but caused significantly reduced acid resistance against the acid solution in comparison with Comparative Examples 1 and 3 with no magnesium oxide. Examples 1 to 5 demonstrate that the presence of hydrotalcite instead of magnesium oxide more improved the adhesiveness than magnesium oxide and caused significantly improved acid resistance.

INDUSTRIAL APPLICABILITY

The peroxide-crosslinkable fluoroelastomer composition in the air management system component of the invention contains a hydrotalcite compound. Thus, the invention can provide an air management system component that well adheres to silicone rubber while maintaining the acid resistance.

The invention claimed is:

1. An air management system component comprising a crosslinked fluoroelastomer layer obtained by crosslinking a fluoroelastomer composition that contains a peroxide-crosslinkable fluoroelastomer and a hydrotalcite compound,
wherein the hydrotalcite compound is present in an amount of 0.5 to 10 parts by mass relative to 100 parts by mass of the fluoroelastomer,
wherein a mass ratio of the fluoroelastomer to a total mass of the crosslinked fluoroelastomer layer is from 100:135.5 to 100:127.5,
wherein the crosslinked fluoroelastomer layer constitutes a laminate with a rubber layer comprising silicone rubber,
wherein the crosslinked fluoroelastomer layer is in direct contact with a rubber layer,
wherein a crosslinking agent is a peroxide-generating crosslinking agent,
wherein the air management system component is used for an exhaust gas recirculation hose,
wherein the peroxide-crosslinkable fluoroelastomer comprises a structural unit derived from VdF and a structural unit derived from HFP,
wherein the silicone rubber comprises a peroxide-crosslinkable polyorganosiloxane, and
wherein the laminate is obtained by a method in which a non-crosslinked fluoroelastomer layer and a non-crosslinked silicone rubber layer are crosslink-bonded to each other in at least one process selected from the group consisting of a process comprising a primary crosslinking step at 150° C. to 180° C. and a secondary crosslinking step at 170° C. to 250° C., and a process comprising a crosslinking step at 150° C. to 180° C.

2. The air management system component according to claim 1,
wherein the hydrotalcite compound is a compound represented by the following formula (1):

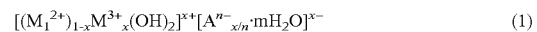
$$[(M_1^{2+})_{1-x}M^{3+}{}_x(OH)_2]^{x+}[A^{n-}{}_{x/n} \cdot mH_2O]^{x-} \qquad (1)$$

wherein $M_1^{2+}$ is a divalent metal ion; $M^{3+}$ is a trivalent metal ion; $A^{n-}$ is an n-valent anion; x is a number satisfying $0<x<0.5$; and m is a number satisfying $0 \leq m$.

3. The air management system component according to claim 1,
wherein, in the formula (1), $M_1^{2+}$ is $Mg^{2+}$ and/or $Zn^{2+}$, $M^{3+}$ is $Al^{3+}$, and $A^{n-}$ is $CO_3^{2-}$.

4. The air management system component according to claim 1,
wherein the hydrotalcite compound is present in an amount of 1 to 6 parts by mass relative to 100 parts by mass of the fluoroelastomer.

* * * * *